US011416527B2

(12) United States Patent
Batta et al.

(10) Patent No.: US 11,416,527 B2
(45) Date of Patent: *Aug. 16, 2022

(54) GEOGRAPHIC PREDICTIVE SEARCH

(71) Applicant: Verizon Patent and Licensing Inc., Basking Ridge, NJ (US)

(72) Inventors: Andrew Batta, Broomfield, CO (US); Carolyn Vlach, Denver, CO (US); Chad Kearney, Denver, CO (US); Kevin Brackney, Westminster, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/947,210

(22) Filed: Jul. 23, 2020

(65) Prior Publication Data

US 2020/0356583 A1   Nov. 12, 2020

Related U.S. Application Data

(63) Continuation of application No. 15/688,269, filed on Aug. 28, 2017, now Pat. No. 10,747,789.

(51) Int. Cl.
*G06F 7/00* (2006.01)
*G06F 16/29* (2019.01)
*G06F 16/903* (2019.01)

(52) U.S. Cl.
CPC ........ *G06F 16/29* (2019.01); *G06F 16/90335* (2019.01)

(58) Field of Classification Search
CPC .... G06F 16/29; G06F 16/903; G06F 16/9535; G06F 16/951; G06F 16/9537; G06F 16/248; G06F 16/9038; H04L 12/1813; H04W 4/029; H04W 4/02
See application file for complete search history.

(56) References Cited

U.S. PATENT DOCUMENTS

| 9,626,454 | B1 * | 4/2017 | Kogan | G06F 16/29 |
| 10,747,789 | B2 * | 8/2020 | Batta | G06F 16/90335 |
| 2014/0032587 | A1 * | 1/2014 | Sankar | G06Q 50/01 707/759 |

(Continued)

OTHER PUBLICATIONS

"Geohash", Wikipedia, https://en.wikipedia.org/wiki/Geohash, May 10, 2017, 5 pages.

*Primary Examiner* — Mohammad A Sana

(57) ABSTRACT

A device can receive a search query from another device. The device can determine an information content of the partial query. The device can determine a set of tiles for identifying search results based on the information content of the partial query. The set of tiles can correspond to a geographic area within a proximity of the other device. The set of tiles can be associated with data identifying a set of points of interest associated with the geographic area. The device can obtain the data identifying the set of points of interest associated with the geographic area based on determining the set of tiles. The device can identify a set of search results based on the partial query and the data identifying the set of points of interest associated with the geographic area. The device can provide information identifying the set of search results.

20 Claims, 6 Drawing Sheets

(56) References Cited

U.S. PATENT DOCUMENTS

| | | | |
|---|---|---|---|
| 2014/0149372 A1* | 5/2014 | Sankar | G06F 16/9535 707/706 |
| 2014/0280318 A1* | 9/2014 | Simms | G06F 16/29 707/769 |
| 2016/0378848 A1 | 12/2016 | Basovnik et al. | |

* cited by examiner

GEOGRAPHIC PREDICTIVE SEARCH

RELATED APPLICATION

This application is a continuation of U.S. patent application Ser. No. 15/688,269, entitled "GEOGRAPHIC PREDICTIVE SEARCH," filed Aug. 28, 2017, which is incorporated herein by reference.

BACKGROUND

Predictive search is a technique for surfacing relevant search results based on a partial user query. Predictive search can be utilized by or for mobile devices, such as when a user of a mobile device searches for a geographic location based on a partial description of an address, name, or the like. Geolocation can also be used (e.g., to identify the geographic location of the mobile device) to determine search results for the partial query that take location into account.

DETAILED DESCRIPTION OF PREFERRED EMBODIMENTS

The following detailed description of example implementations refers to the accompanying drawings. The same reference numbers in different drawings can identify the same or similar elements.

A mobile device can receive a search query (e.g., a set of characters) and can provide the search query to a query server. The query server can identify one or more potential matches to the search query, and can provide information identifying the one or more potential matches to the mobile device for display to a user. Predictive search can be used to provide search results before a user has finished specifying a search query. For example, when the mobile device receives a partial query (e.g., a set of characters "newsp"), the mobile device can provide the partial query to the query server, which can provide information identifying a predicted complete query (e.g., "newspaper," "newspapers," "news program," etc.) or can provide information identifying one or more potential matches to the partial query or at least one of the predicted complete queries. In this way, the mobile device and/or the query server can assist a user in entering a complete query and/or can reduce an amount of time to provide results to the complete query relative to waiting for the user to enter the complete query. However, identifying potential matches to a partial query can utilize excessive processing resources. Moreover, an amount of data that is to be searched to identify the potential matches to the partial query can result in an excessive amount of time to provide results for the partial query, thereby obviating a time-savings from utilizing the partial query relative to using a complete query.

Some implementations, described herein, provide a mechanism for identifying a subset of data from which to identify potential matches for a partial query. For example, a query server can determine a set of tiles representing a set of geographic areas within a particular proximity of a mobile device, and can identify potential matches for a partial query from data pertaining to the set of tiles. In this way, the query server can reduce an amount of data from which a potential match to a partial query is to be identified, thereby reducing a utilization of processing resources, reducing an amount of time to identify the potential matches, reducing a quantity of potential matches that are identified, reducing an amount of network traffic associated with identifying the potential matches to the mobile device, and/or the like.

Figure 1A:
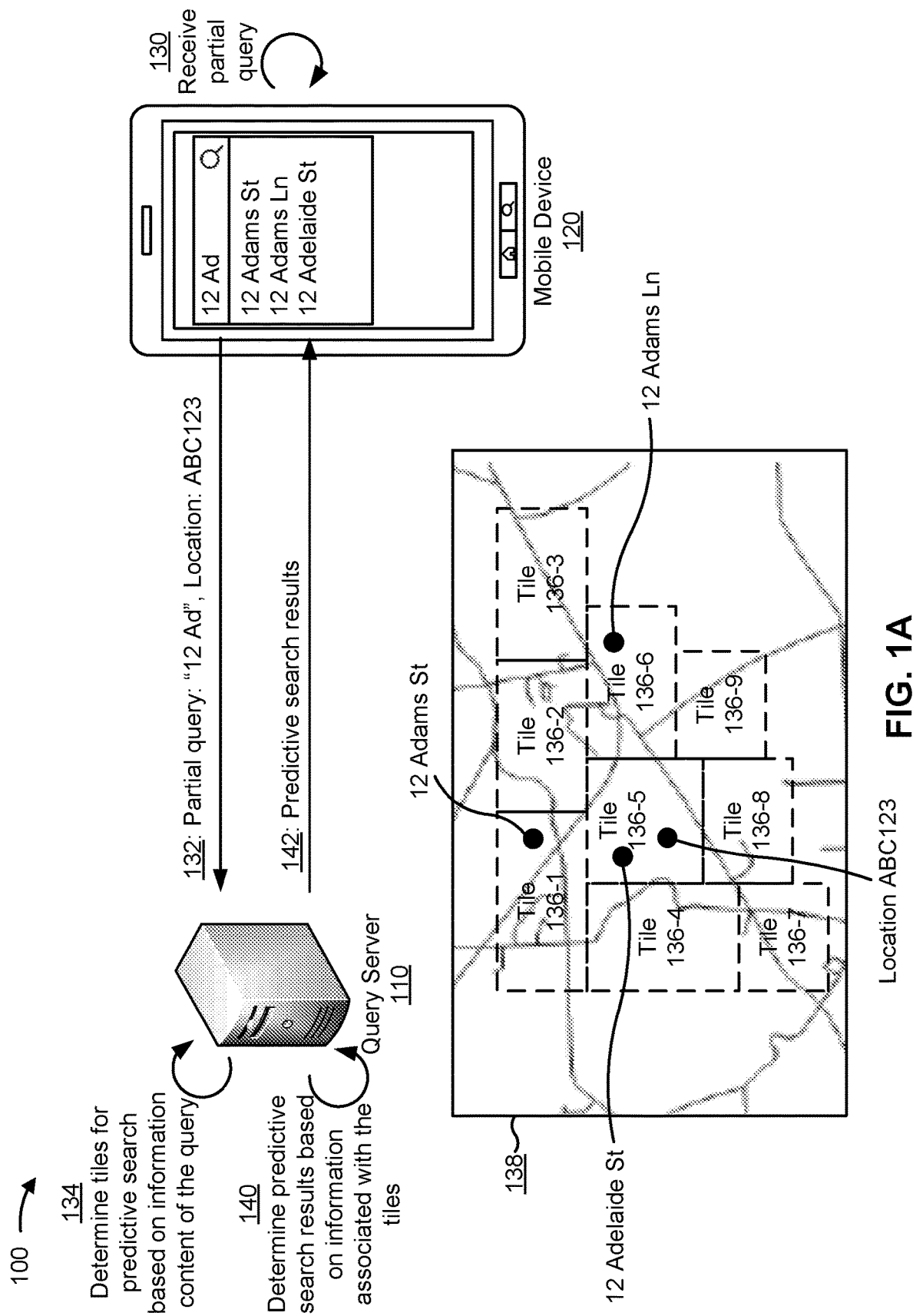
FIGS. 1A and 1B are diagrams of an overview of an example implementation described herein.
Figure 1B:
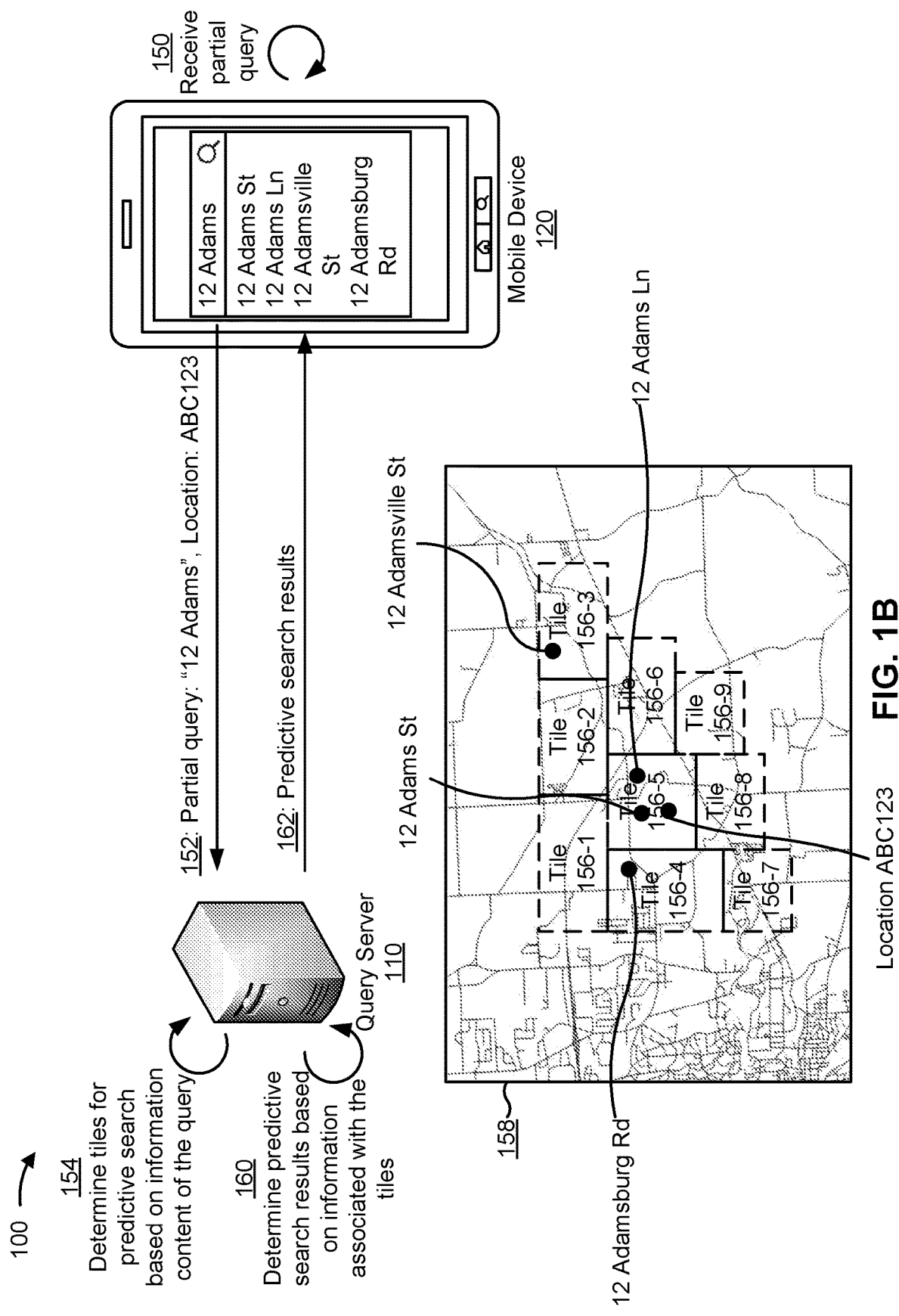

FIGS. 1A and 1B are diagrams of an overview of an example implementation 100 described herein. As shown in FIGS. 1A-1B, example implementation 100 includes query server 110 and mobile device 120.

As further shown in FIG. 1A, and by reference number 130, mobile device 120 can receive (e.g., from a user of mobile device 120 via a user interface of mobile device 120) a partial query (shown as "12 Ad"). As shown by reference number 132, mobile device 120 can provide, to query server 110, information associated with the partial query and a location (shown as ABC123) of mobile device 120. In some implementations, the location can be a location of mobile device 120. In some implementations, such as when query server 110 receives a query from a non-mobile device, the location can be a selected location, such as a user's home, a user's office, and/or the like. As shown by reference number 134, query server 110 can determine tiles for predictive search based on an information content of the query. In this case, the tiles can correspond to geographic areas (e.g., geohashes) representing subsets of an area (e.g., tiles 136-1 through 136-9 of area 138). The tiles can be distributed in a vicinity of the location (ABC123) of mobile device 120 (e.g., 9 tiles forming a grid around the location, as shown) and can be rectangular (as shown) or other shapes or combinations of shapes.

Tiles can be associated with different levels (e.g., a first level can correspond to 1 square mile tiles, a second level can correspond to 10 square mile tiles, a third level can correspond to 50 square mile tiles, etc.). In some implementations, query server 110 can determine a level and/or tile size based on an information content (e.g., a number of characters, frequency of characters, pre-computed information, etc.) that corresponds to a degree of specificity of the query. In other words, a query with a higher information content than another query is more likely, relative to having a lower information content, to have a smaller number of search results than the other query. For example, query server 110 can use larger tiles based on a greater quantity of characters in the partial query, as more specificity yields a smaller number of results. In this case, "12 Ad" is a relatively broad query (and can return a relatively large number of results). As a result, query server 110 can determine a level corresponding to a tile size that is relatively small to reduce a total quantity of results, and to reduce an amount of data that is to be searched to obtain a threshold quantity of results.

As further shown in FIG. 1A, and by reference number 140, query server 110 can determine predictive search results based on information associated with the tiles. For example, query server 110 can search data relating to the selected tiles to obtain the results. As shown by reference number 142, query server 110 can provide the predictive search results to mobile device 120. Based on limiting the search to tiles at the selected level, the query server reduces an amount of data to search.

As shown in FIG. 1B, and by reference number 150, mobile device 120 can receive (e.g., from a user of mobile device 120 in a fashion similar to that described with respect to FIG. 1A) another partial query (shown as "12 Adams"). As shown by reference number 152, mobile device 120 can provide, to query server 110, information associated with the partial query and the location of mobile device 120.

As further shown in FIG. 1B, and by reference number 154, query server 110 can determine tiles for predictive search based on information content of the query. In this case, the tiles can correspond to geographical areas representing subsets of an area (e.g., tiles 156-1 through 156-9 of area 158). The tiles can be distributed in a vicinity of the location (ABC123) of mobile device 120 in a fashion similar to that described with respect to FIG. 1A.

In this case, the partial query "12 Adams" is associated with a greater information content than the partial query "12 Ad" (and thus can return a smaller number of results), so query server 110 can determine a level corresponding to a tile size that is larger than the tile size determined for partial query "12 Ad" (as was described with respect to FIG. 1A). As shown by reference number 160, query server 110 can determine predictive search results based on information associated with the tiles. As shown by reference number 162, query server 110 can provide the predictive search results to mobile device 120.

In this way, the query server can reduce an amount of data from which a potential match to a partial query is to be identified, thereby reducing a utilization of processing resources, reducing an amount of time to identify the potential matches, reducing a quantity of potential matches that are identified, reducing an amount of network traffic associated with identifying the potential matches to the mobile device, and/or the like. Moreover, based on increasing a selected tile size when an information content is greater than a threshold, the query server reduces a likelihood that a search of data pertaining to the selected tiles of the selected tile size fails to return a threshold quantity of results, thereby reducing processing and response time relative to performing another search of data pertaining to another set of tiles after the search data fails to return the threshold quantity of results.

As indicated above, FIGS. 1A and 1B are provided merely as examples. Other examples are possible and can differ from what was described with regard to FIGS. 1A and 1B.

Figure 2:
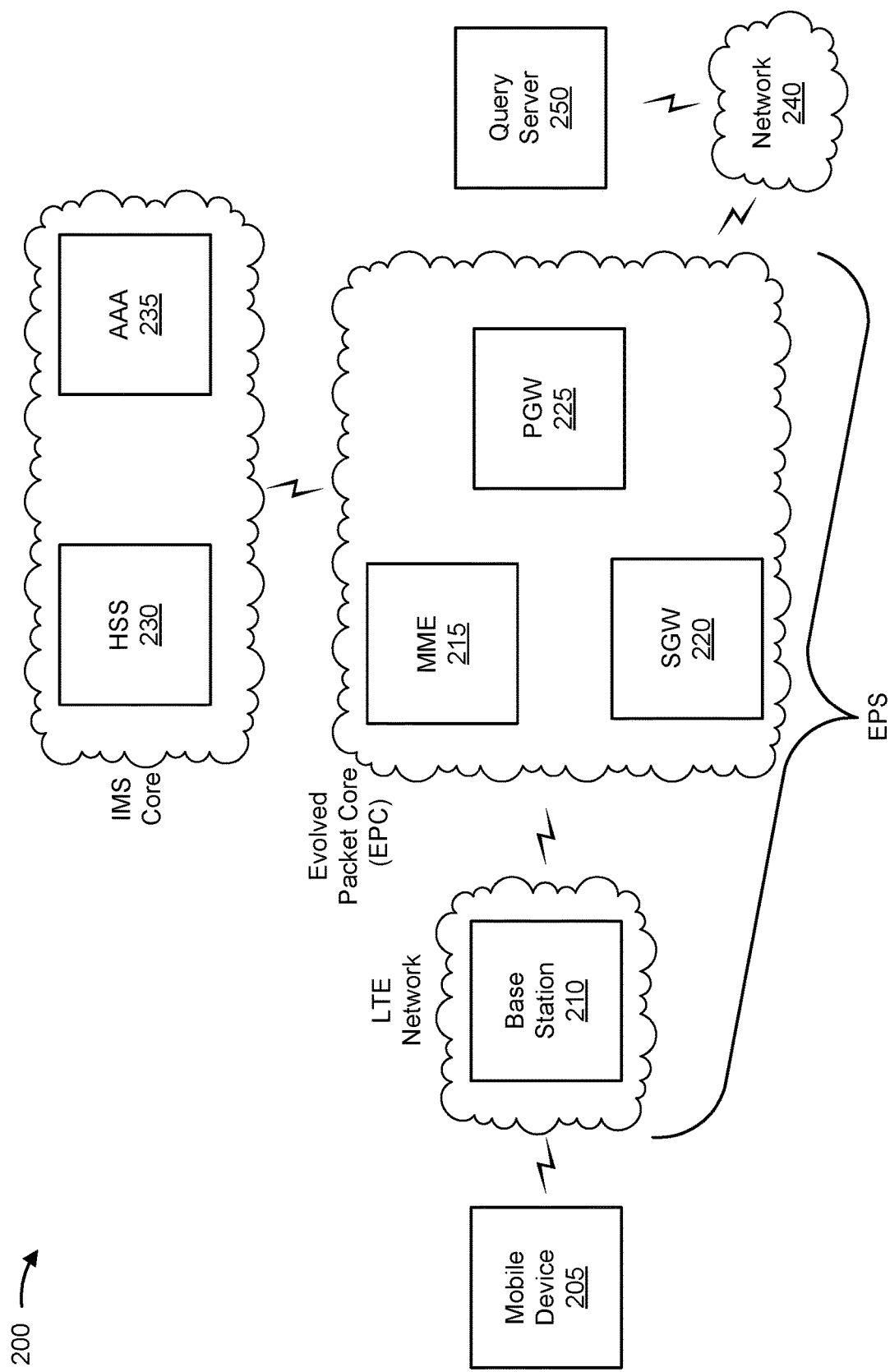
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a mobile device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; a network 240; and a query server 250. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a third generation (3G) network.

Environment 200 can include an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 that take the form of evolved Node Bs (eNBs) via which mobile device 205 communicates with the EPC. The EPC can include MME 215, SGW 220, and/or PGW 225 that enable mobile device 205 to communicate with network 240 and/or an Internet protocol (IP) multimedia subsystem (IMS) core. The IMS core can include HSS 230 and/or AAA 235, and can manage device registration and authentication, session initiation, etc., associated with mobile devices 205. HSS 230 and/or AAA 235 can reside in the EPC and/or the IMS core.

Mobile device 205 can include one or more devices capable of communicating with base station 210 and/or a network (e.g., network 240). For example, mobile device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. Mobile device 205 can send traffic to and/or receive traffic from network 240 (e.g., via base station 210, SGW 220, and/or PGW 225). In some implementations, mobile device 205 corresponds to mobile device 120 shown in FIGS. 1A and 1B.

Base station 210 can include one or more devices capable of transferring traffic, such as audio, video, text, and/or other traffic, destined for and/or received from mobile device 205. In some implementations, base station 210 can include an eNB associated with the LTE network that receives traffic from and/or sends traffic to network 240 via SGW 220 and/or PGW 225. Additionally, or alternatively, one or more base stations 210 can be associated with a RAN that is not associated with the LTE network. Base station 210 can send traffic to and/or receive traffic from mobile device 205 via an air interface. In some implementations, base station 210 can include a small cell base station, such as a base station of a microcell, a picocell, and/or a femtocell.

MME 215 can include one or more devices, such as one or more server devices, capable of managing authentication, activation, deactivation, and/or mobility functions associated with mobile device 205. In some implementations, MME 215 can perform operations relating to authentication of mobile device 205. Additionally, or alternatively, MME 215 can facilitate the selection of a particular SGW 220 and/or a particular PGW 225 to serve traffic to and/or from mobile device 205. MME 215 can perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 can select another MME (not pictured), to which mobile device 205 should be handed off (e.g., when mobile device 205 moves out of range of MME 215).

SGW 220 can include one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 240 (e.g., via PGW 225) and/or other network devices associated with the EPC and/or the IMS core. SGW 220 can also receive traffic from network 240 and/or other network devices, and can send the received traffic to mobile device 205 via base station 210. Additionally, or alternatively, SGW 220 can perform operations associated with handing off mobile device 205 to and/or from an LTE network.

PGW 225 can include one or more devices capable of providing connectivity for mobile device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 240. Additionally, or alternatively, PGW 225 can receive traffic from network 240, and can send the traffic to mobile device 205 via SGW 220 and base station 210. PGW 225 can record data usage information (e.g., byte usage), and can provide the data usage information to AAA 235.

HSS 230 can include one or more devices, such as one or more server devices, capable of managing (e.g., receiving, generating, storing, processing, and/or providing) information associated with mobile device 205. For example, HSS 230 can manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 can include one or more devices, such as one or more server devices, that perform authentication, authorization, and/or accounting operations for communication sessions associated with mobile device 205. For example, AAA 235 can perform authentication operations for mobile device 205 and/or a user of mobile device 205 (e.g., using one or more credentials), can control access, by mobile device 205, to a service and/or an application (e.g., based on one or more restrictions, such as time-of-day restrictions, location restrictions, single or multiple access restrictions, read/write restrictions, etc.), can track resources consumed by mobile device 205 (e.g., a quantity of voice minutes consumed, a quantity of data consumed, etc.), and/or can perform similar operations.

Network 240 can include one or more wired and/or wireless networks. For example, network 240 can include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Query server 250 includes one or more devices capable of receiving, generating, storing, processing, and/or providing information associated with providing results for a geographic predictive search. For example, query server 250 can include a server that receives a partial query, determines an information content of the partial query, selects a set of tiles corresponding to a geographic area for a predictive search based on the information content of the partial query, performs the predictive search using data pertaining to the set of tiles, and provides search results based on the predictive search. In some implementations, query server 250 can be external to the EPS. Additionally, or alternatively, query server 250 can be collocated with other devices of the EPS, such as being collocated in the EPC, collocated in the IMS core, and/or the like. In some implementations, query server 250 corresponds to query server 110 shown in FIGS. 1A and 1B.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
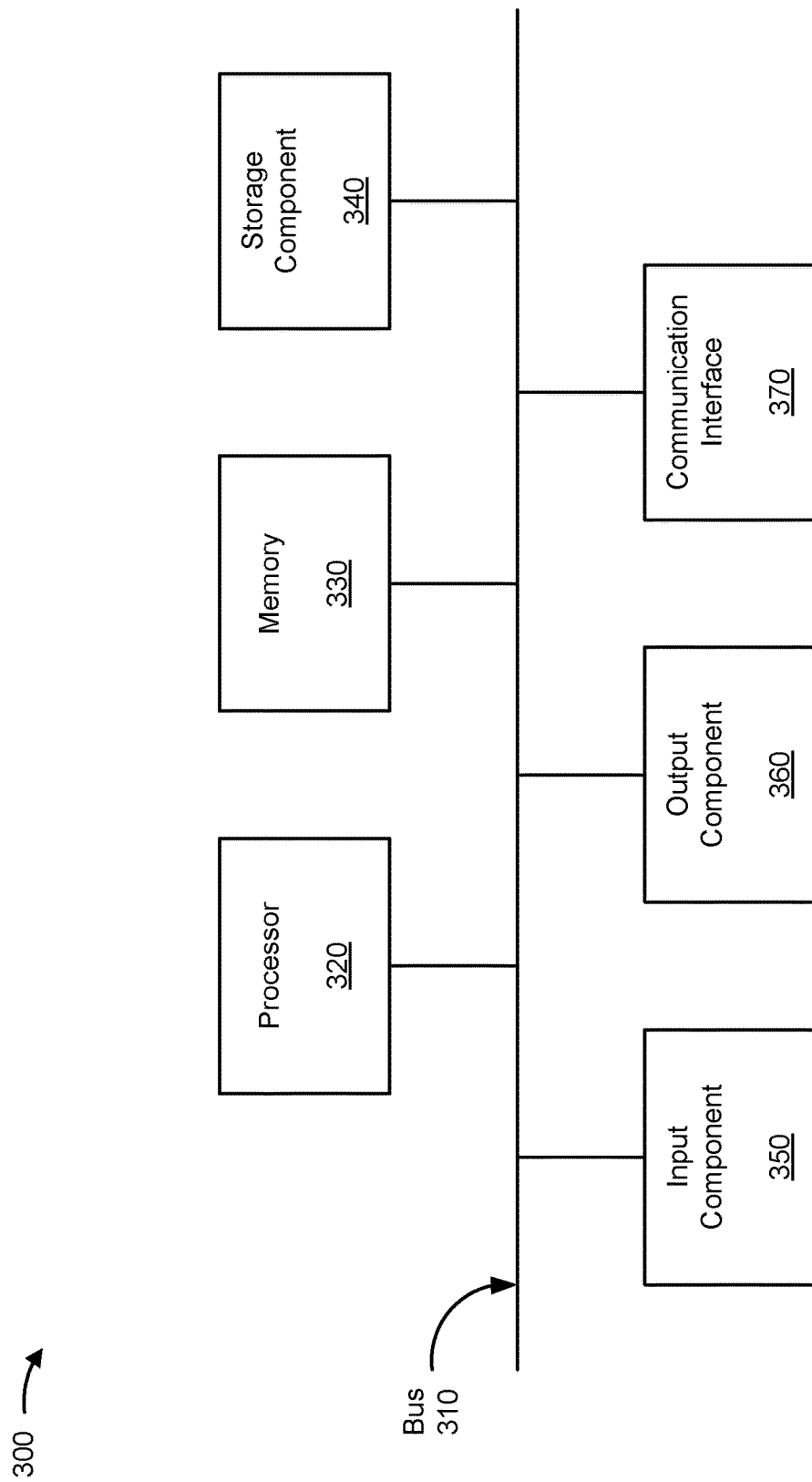
FIG. 3 is a diagram of example components of one or more devices of FIG. 2.

FIG. 3 is a diagram of example components of a device 300. Device 300 can correspond to mobile device 205, base station 210, MME 215, SGW 220, PGW 225, HSS 230, AAA 235, and/or query server 250. In some implementations, mobile device 205, base station 210, MME 215, SGW 220, PGW 225, HSS 230, AAA 235, and/or query server 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
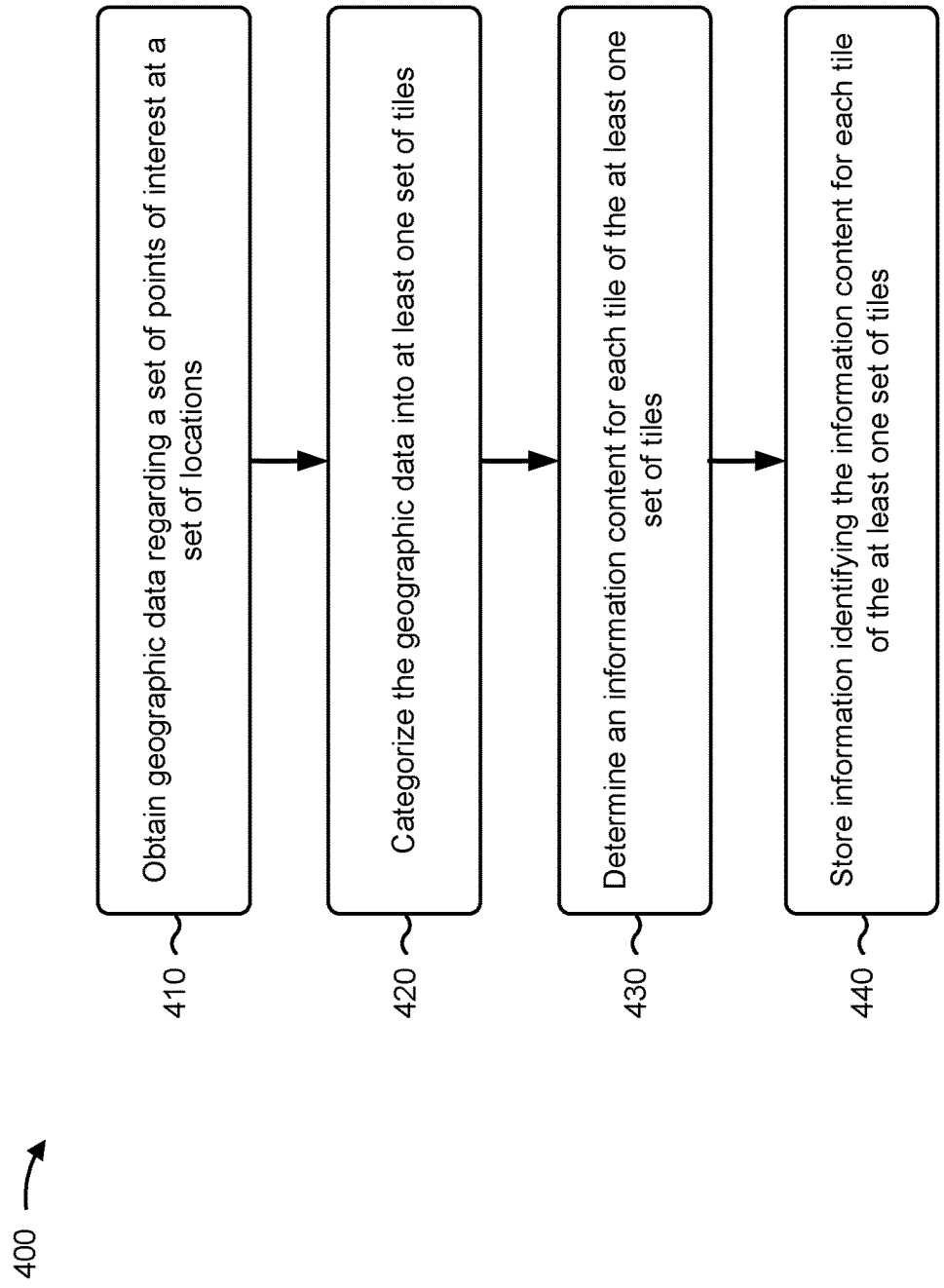
FIG. 4 is a flow chart of an example process for determining a tiling for classifying geographic data.

FIG. 4 is a flow chart of an example process 400 for determining a tiling for classifying geographic data. In some implementations, one or more process blocks of FIG. 4 can be performed by query server 250. In some implementations, one or more process blocks of FIG. 4 can be performed by another device or a group of devices separate from or including query server 250, such as mobile device 205.

As shown in FIG. 4, process 400 can include obtaining geographic data regarding a set of points of interest at a set of locations (block 410). For example, query server 250 can obtain geographic data regarding a set of points of interest at a set of locations. In some implementations, geographic data can include map data, point of interest data, geography data, topography data, address data, and/or the like. In some implementations, points of interest can include addresses, landmarks, businesses, restaurants, people's homes, and/or the like. In some implementations, the set of locations can include a particular geographic area, city, state, country, continent, the world, and/or the like.

In some implementations, query server 250 can obtain the geographic data from a data structure (e.g., stored data), from a data source (e.g., a review website, a social media site, a news article, such as by using natural language processing), and/or the like. Additionally, or alternatively, query server 250 can obtain the geographic data using previous queries. For example, if, after entering a query for "The White House" and not receiving a result, a mobile device ended up with a person driving to 1600 Pennsylvania Ave, Wash. D.C. based on location data, query server 250 can have stored that address as The White House.

In this way, query server 250 can obtain geographic data regarding a set of points of interest at a set of locations.

As further shown in FIG. 4, process 400 can include categorizing the geographic data into at least one set of tiles (block 420). For example, query server 250 can categorize the geographic data into at least one set of tiles. In this case, a tile can correspond to a particular geographical area (e.g., a particular square mile of area in a particular geographical location). In this way, query server 250 can conserve processing resources compared to calculating road distance to each location from a particular mobile device location. For example, in order to identify a grocery store that a user can drive to within 10 minutes, less processing can be required to search for grocery stores within 1 square mile than to determine whether the user can drive to a grocery store within 10 minutes.

In some implementations, different sets of tiles can include different geographic sizes. In this case, the different sets of tiles can correspond to different levels of tiles (e.g., level 1, level 2, level 3, etc.). For example, level 1 can correspond to a 1 square mile tile, level 2 can correspond to a 5 square mile tile, and level 3 can correspond to an amount of area in a 10 square mile. Although described herein in terms of a particular set of levels and tile shapes, other types of levels and tile shapes can be possible.

In some implementations, query server 250 can define tiles that are larger where roads have higher speed limits, on average, because it takes less time to get to farther results. Additionally, or alternatively, query server 250 can base tiles on an amount of land area (e.g., rather than an amount of total geographical area). For example, a tile that includes a lake can include 20 square miles of space but 1 square mile of land area.

In some implementations, query server 250 can define levels based on density of information. For example, level 1 can be associated with a 1 square mile tile in Manhattan, and can be associated with a 100 square mile tile Montana, based on those two areas having a same or similar quantity of roads, addresses, people, points of interest, roads, road segments (e.g., a portion of a road between two intersections), or the like. As a specific example, as Manhattan has high road density and Montana has low road density, a tile in Montana can be associated with a same level as a much smaller tile in Manhattan, based on having the same quantity of roads.

In some implementations, query server 250 can determine tile size to obtain a threshold quantity of results for a bigram (or for each bigram). For example, in order to have no less than 5 results, query server 250 can create tile sizes so each bigram is represented by at least 5 results. Similarly, in order to have no more than 10 results for each bigram search in each tile, query server 250 can create tile sizes so each bigram is represented by at most 10 results. Additionally, or alternatively, query server 250 can determine tile size based on a trigram or another type of n-gram.

In some implementations, query server 250 can use different sets of tiles for different bigrams. For example, for a search query of "12", query server 250 can use a different set of tiles than a search query of "Da" and a different set of tiles from a search query of "4 N". In this way, by precomputing each set of tiles, query server 250 can select tile size to ensure a threshold quantity of results are obtained using a selected set of tiles in less time than searching using all data regarding all geographic locations and with less than a threshold likelihood of failing to obtain the threshold quantity of results.

In some implementations, query server 250 can categorize a particular point of interest into multiple tiles (e.g., a first tile at level one, a second tile at level two, a third tile at level three) where each of the tiles includes the point of interest geographically. Additionally, or alternatively, query server 250 can categorize a particular point of interest into a tile that does not include the point of interest. As an example, query server 250 can include Waffle Houses in a tile the user is located in because someone searching "Wa" for a Waffle House is likely only looking for the Waffle House closest to them. In contrast, query server 250 can include the Washington Monument in 10 square mile tiles that are as far as 100 miles away to make sure that someone searching "Wa" for the Washington Monument sees that result. In other words, even though the Washington monument is not in Delaware, someone searching for "Wa" in Delaware can be looking for the Washington monument, which is relatively far away or a Waffle House that is relatively close, so the Washington monument can be included in data that is searched for in a tile covering Delaware.

In some implementations, query server 250 can categorize the geographic data into a predetermined set of tiles (e.g., geohashes). In some implementations, query server 250 can categorize the geographic data into configured sets of tiles (e.g., based on overlaying a customized set of tiles for performing geographic predictive search).

In this way, query server 250 can categorize the geographic data into at least one set of tiles.

As further shown in FIG. 4, process 400 can include determining an information content for each tile of the at least one set of tiles (block 430). For example, query server 250 can determine an information content for each tile of the at least one set of tiles.

In some implementations, information content for a particular tile can include an amount of information/data categorized into the particular tile. Information content can relate to quantity of addresses in a tile, quantity of Points of Interest in the tile, and/or the like.

In some implementations, if tiles are determined (e.g., as described herein with respect to block 420) to have approximately equal information content (e.g., while having different sizes based on location), then information content will be approximately equal. However, if tiles are determined (as described herein with respect to block 420) to have approximately equal size (e.g., regardless of location or density of information), then information content can be very different. In some implementations, query server 250 can pre-compute information content for a tile as it relates to certain partial queries. For example, query server 250 can pre-compute quantity of results for each bigram ("aa" "ab" "ac" . . . "zz"), trigram, numbers ("1" "11" "12") and/or the like. In this case, query server 250 can utilize the information identifying the information content for each tile in selecting tiles for use in performing predictive search.

In this way, query server 250 can determine an information content for each tile of the at least one set of tiles.

As further shown in FIG. 4, process 400 can include storing information identifying the information content for each tile of the at least one set of tiles (block 440). For example, query server 250 can store information identifying the information content for each tile of the at least one set of tiles.

In some implementations, query server 250 can store, in a data structure, information regarding each tile of each set of tiles. In some implementations, query server 250 can store the information based on pre-computing data (e.g., in an initial determination of tiles). In some implementations, query server 250 can store the information based on a query. For example, a user can select a result from a partial query, and query server 250 can store information regarding the partial query, the result, the tile, and/or the like.

In this way, query server 250 can store information identifying the information content for each tile of the at least one set of tiles.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
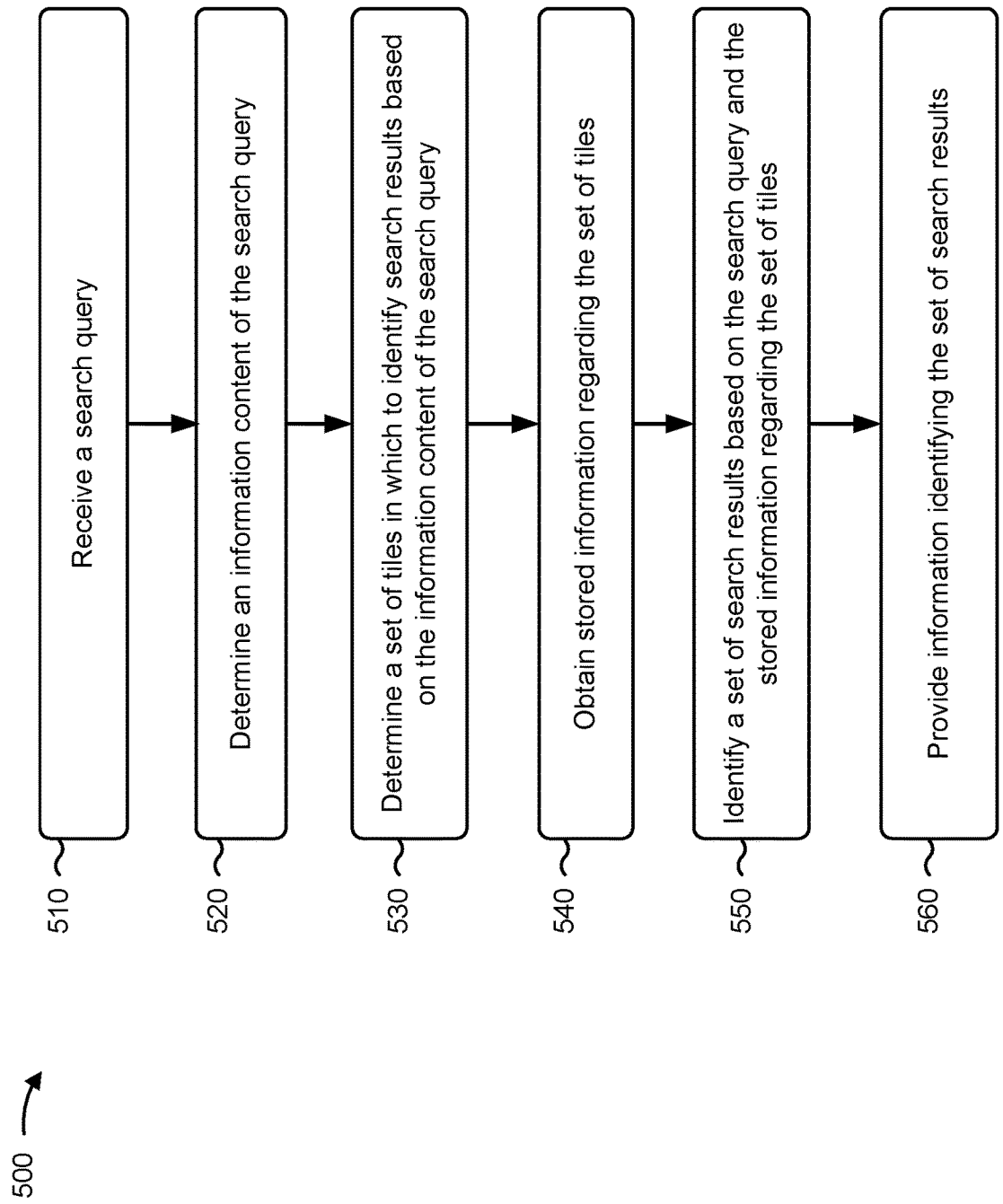
FIG. 5 is a flow chart of an example process for geographic predictive search.

FIG. 5 is a flow chart of an example process 500 for geographic predictive search. In some implementations, one or more process blocks of FIG. 5 can be performed by query server 250. In some implementations, one or more process blocks of FIG. 5 can be performed by another device or a group of devices separate from or including query server 250, such as mobile device 205.

As shown in FIG. 5, process 500 can include receiving a search query (block 510). For example, query server 250 can receive a search query.

In some implementations, query server 250 can receive the search query from mobile device 205 (e.g., via textual input to a user interface of mobile device 205, voice input to the mobile device 205, etc.). In some implementations, the search query can be a partial query, a complete query, and/or the like.

In some implementations, the search query can be a predicted query. In this case, query server 250 can receive a partial query, predict a complete query, and use the complete query for a search. For example, query server 250 can receive "Washingto" and can use "Washington", "Washingtonian", "Washington Post", "George Washington", and/or the like as the query. In this way, query server 250 can increase an information content of the query, thereby reducing a likelihood of providing an incorrect result. Additionally, query server 250 can enable utilization of a higher level of tile (larger tile), thereby reducing a likelihood of failing to find a result. As another example, query server 250 can pre-compute predictive querying. For example, query server 250 can pre-determine that "Washingto" is a partial query of "Washington" rather than a partial query of "Washingtox" based on analysis of word data, based on previous user queries (other users, same user, etc.) and/or the like, thereby reducing an amount of time to determine a predictive query relative to determining the predictive query based on receiving the partial query.

In some implementations, the search query can include less than a threshold quantity of characters. For example, query server 250 can use tiling when the query is less than 5 characters, and can search all data when the query is equal to or greater than 5 characters. Thereby, query server 250 can reduce utilization of processing resources relative to determining the information content of the search query and determining the set of tiles when the search query is greater than the threshold quantity of characters (e.g., when the search query does not need a small set of tiles to identify a search result without an excessive amount of processing).

In this way, query server 250 can receive a search query.

As further shown in FIG. 5, process 500 can include determining an information content of the search query (block 520). For example, query server 250 can determine an information content of the search query.

In some implementations, query server 250 can determine the information content based on an amount of characters, a frequency of the characters (e.g., a first query "9 Xavi" can be more specific than a second query "1 Ad", so the first query has a higher information content), and/or the like. In some implementations, query server 250 can use pre-computed information (e.g., bigrams computation) to determine the information content of the query. In some implementations, query server 250 can use word data analysis, machine learning, and/or the like to determine the information content of the query.

In this way, query server 250 can determine an information content of the search query.

As further shown in FIG. 5, process 500 can include determining a set of tiles in which to identify search results based on the information content of the search query (block 530). For example, query server 250 can determine a set of tiles in which to identify search results based on the information content of the search query.

In some implementations, query server 250 can determine a level of tiles. For example, query server 250 can select, for relatively higher information content, larger tiles (larger in geography, information content, addresses, address density, etc.) than for relatively lower information content. Additionally, or alternatively, query server 250 can determine a quantity of tiles based on an information content. For example, query server 250 can select a particular quantity of tiles to ensure that a threshold information content, pre-calculated for each tile, is included in the set of tiles.

In some implementations, query server 250 can dynamically determine a tile. For example, query server 250 can determine a tile size that includes a threshold quantity of road segments or addresses. In this case, instead of using a preset tile size (e.g., 10 square miles), query server 250 can expand a tile from directly around the user until a threshold quantity of road segments or other points of interest are encompassed by the tile (e.g., 1000 road segments, 1000 addresses, etc.).

In some implementations, query server 250 can determine a location of a tile. For example, query server 250 can determine a tile to be centered on a mobile device location (determined based on positioning data, such as GPS data, triangulation, trilateration, etc.). Additionally, or alternatively, query server 250 can determine a tile to be centered on multiple locations. For example, query server 250 can determine a user to live at location A and work at location B, and can select tiles surrounding location A and location B based on a query (e.g., "barbe") for a barber, because a user can be more likely to want a barber near the user's home or office than at a location along the route between the user's home and office.

In some implementations, query server 250 can determine a location of tile in a manner that is skewed in a particular direction. For example, query server 250 can determine a location of tile in a manner that is skewed based on a geographic parameter (e.g., for a mobile device 205 in downtown Chicago, tiles can be skewed west because the user can be unlikely to be searching for locations in Lake Michigan or across Lake Michigan).

In some implementations, query server 250 can determine a location of tile in a manner that is skewed based on movement. For example, for a mobile device 205 that is moving on a highway (determined based on mobile device location, mobile device utilization of GPS directions, etc.), for a partial query (e.g., "Gas St") of a gas station, the user is more likely to be looking for a gas station in a direction that the user is traveling along the route rather than behind the user.

In some implementations, query server 250 can determine a quantity of tiles. For example, query server 250 can determine a single tile that includes the user location. As another example, query server 250 can determine multiple tiles surrounding the user location (e.g., 9 tiles around the user or another quantity of tiles around the user). In this way, query server 250 improves likelihood of finding a result for the user relative to a single tile where the user can be at the edge of the single tile. Alternatively, query server 250 can determine some other quantity of tiles around the user. Continuing with the Chicago example, query server 250 can determine 6 tiles: the tile in which the user is located, a northward tile, a southward tile, a northwestward tile, a westward tile, and a southwestward tile (omitting the northeastward, eastward, and southeastward tiles).

In this way, query server 250 can determine a set of tiles in which to identify search results based on the information content of the search query.

As further shown in FIG. 5, process 500 can include obtaining stored information regarding the set of tiles (block 540). For example, query server 250 can obtain stored information regarding the set of tiles.

In some implementations, query server 250 can determine data entries regarding the set of tiles. For example, query server 250 can determine addresses associated with the set of tiles, such as addresses of locations located in the set of tiles, addresses categorized into the set of tiles and not located in the set of tiles (e.g., as in the Washington Monument example, described herein with respect to block 420).

In this way, query server 250 can obtain stored information regarding the set of tiles.

As further shown in FIG. 5, process 500 can include identifying a set of search results based on the search query and the stored information regarding the set of tiles (block 550). For example, query server 250 can identify a set of search results based on the search query and the stored information regarding the set of tiles.

In some implementations, query server 250 can determine a set of potential matches to the search query based on the stored information regarding the set of tiles. For example, for a partial query of "12 Ad" as described herein with respect to FIG. 1A, query server 250 can identify "12 Adams St", "12 Adams Ln", and "12 Adelaide St" as potential matches, based on identifying corresponding locations in the set of tiles. In this case, because, because "12 Ad" is a relatively broad query, query server 250 can use a set of tiles that are relatively small (e.g., 1 square mile).

As another example, for a partial query of "12 Adams" as described herein with respect to FIG. 1B, query server 250 can identify "12 Adams St", "12 Adams Ln", "12 Adamsville St", and "12 Adamsburg Rd" as potential matches, based on identifying corresponding locations in the set of tiles. In this case, because "12 Adams" is a narrower query than "12 Ad", query server 250 can use a set of tiles that are larger (e.g., 5 square miles) than the set of tiles used for "12

Ad" as described herein. Accordingly, query server 250 can identify "12 Adamsville St" and "12 Adamsville Rd" as potential matches for "12 Adams" because they are included in the larger tiles, as shown. Additionally, query server 250 does not identify "12 Adelaide St" as a potential match for "12 Adams" because "12 Adelaide St" is not covered by the narrower query of "12 Adams".

In this way, query server 250 can identify a set of search results based on the search query and the stored information regarding the set of tiles.

As further shown in FIG. 5, process 500 can include providing information identifying the set of search results (block 560). For example, query server 250 can provide information identifying the set of search results.

In some implementations, query server 250 can transmit information identifying the set of search results to mobile device 205 for display. In some implementations, query server 250 can generate a user interface including the set of results. In some implementations, query server 250 can provide information identifying a subset of search results. For example, query server 250 can provide the closest search results, can provide the most popular search results (e.g., the search results most commonly used for directions, the search results with the most reviews on a review site, the search results with the best reviews on a review site, etc.), can provide alphabetical search results, and/or the like. In some implementations, query server 250 can select a threshold subset (e.g., only provide 5 results, 10 results, 5% of results, a quantity of results that fit in one user interface screen at a particular text size, etc.), and provide the threshold subset (e.g., to mobile device 205).

In this way, query server 250 can provide information identifying the set of search results.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Some implementations, described herein, provide a mechanism for identifying a subset of data from which to identify potential matches for a partial query. For example, a query server can determine a set of tiles representing a set of geographic areas within a particular proximity of a mobile device 205, and can identify potential matches for a partial query from data pertaining to the set of tiles. In this way, the query server can reduce an amount of data from which a potential match to a partial query is to be identified, thereby reducing a utilization of processing resources, reducing an amount of time to identify the potential matches, reducing a quantity of potential matches that are identified, reducing an amount of network traffic associated with identifying the potential matches to the mobile device 205, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a partial query from another device;
determine a set of tiles for identifying search results based on information content of the partial query that corresponds to a degree of specificity of the partial query,
the set of tiles corresponding to a geographic area within a proximity of the another device, and
a size of the set of tiles being positively correlated with a degree of specificity in the information content of the partial query;
identify a set of search results based on the partial query and data identifying a set of points of interest associated with the geographic area; and
provide information identifying the set of search results.

2. The device of claim 1, wherein the information content includes at least one of:
a quantity of characters,
a frequency of characters, or
pre-computed information.

3. The device of claim 2, wherein the one or more processors are further to:
obtain geographic data regarding a plurality of points of interest at a plurality of locations,
the geographic data including the data and the plurality of points of interest including the set of points of interest; and
wherein the one or more processors are further to:
categorize the geographic data into at least one set of tiles,
wherein each tile corresponds to a particular geographical area.

4. The device of claim 3, wherein the one or more processors are further to:
obtain the geographic data from at least one of:
a data structure,
a data source, or
previous queries.

5. The device of claim 1, wherein the set of tiles is selected to obtain a threshold quantity of search results.

6. The device of claim 1, wherein the one or more processors are to:
determine that the information content satisfies a threshold; and
wherein the one or more processors, when determining the set of tiles, are to:
select a level for the set of tiles, from a plurality of levels of tiles, based on determining that the information content satisfies the threshold; and
select the set of tiles from a particular plurality of tiles of the level for the set of tiles based on selecting the level for the set of tiles,
each level, of the plurality of levels of tiles, including a plurality of tiles associated with the level.

7. The device of claim 6, wherein the one or more processors are further to:
categorize a particular point of interest into a first level, of the plurality of levels of tiles, and a second level, of the plurality of levels of tiles.

8. A non-transitory computer-readable medium storing instructions, the instructions comprising:
one or more instructions that, when executed by one or more processors, cause the one or more processors to:
receive a search query from another device;
determine a quantity of characters of the search query;
determine a set of tiles for identifying search results based on the quantity of characters of the search query,
the set of tiles corresponding to a geographic area within a proximity of the another device, and
a size of the set of tiles being positively correlated with the quantity of characters of the search query;
identify a set of search results based on the search query and data identifying a set of points of interest associated with the geographic area; and
provide information identifying the set of search results.

9. The non-transitory computer-readable medium of claim 8, wherein the search query is one of:
a partial query, or
a complete query.

10. The non-transitory computer-readable medium of claim 8, wherein the search query is a partial query, and
wherein the one or more instructions, when executed by the one or more processors, further cause the one or more processors to:
predict a complete query based on receiving the partial query; and
use the complete query when determining the set of tiles.

11. The non-transitory computer-readable medium of claim 8, wherein the one or more instructions, when executed by the one or more processors, further cause the one or more processors to:
obtain geographic data regarding a plurality of points of interest at a plurality of locations,
the geographic data including the data and the plurality of points of interest including the set of points of interest;
classify the geographic data into a plurality of tiles,
the plurality of tiles including the set of tiles; and
store information associated with the plurality of tiles based on classifying the geographic data into the plurality of tiles and before receiving the search query.

12. The non-transitory computer-readable medium of claim 11, wherein the one or more instructions, that cause the one or more processors to determine the set of tiles, cause the one or more processors to:
select the set of tiles from the plurality of tiles.

13. The non-transitory computer-readable medium of claim 11, wherein the one or more instructions, that cause the one or more processors to obtain the geographic data, cause the one or more processors to:
obtain the geographic data from at least one of:
a data structure,
a data source, or
previous queries.

14. The non-transitory computer-readable medium of claim 8, wherein the set of tiles is selected to obtain a threshold quantity of search results.

15. A method, comprising:
receiving, by a device, a partial query;
determining, by the device, an information content of the partial query,
wherein the information content includes at least one of:
a quantity of characters,
a frequency of characters, or pre-computed information;
determining, by the device, a set of tiles for identifying search results based on the information content of the partial query,
 the set of tiles corresponding to a geographic area, and
 a size of the set of tiles being positively correlated with a degree of specificity in the information content of the partial query;
obtaining, by the device, data identifying a set of points of interest associated with the geographic area based on determining the set of tiles;
identifying, by the device, a set of search results based on the partial query and the data identifying the set of points of interest associated with the geographic area; and
providing, by the device, information identifying the set of search results.

16. The method of claim 15, wherein the information content includes the quantity of characters, and
 wherein determining the information content comprises:
  determining that the information content satisfies less than a threshold quantity of characters; and
  determining the set of tiles based on determining that the information content satisfies less than the threshold quantity of characters.

17. The method of claim 15, wherein the information content includes the quantity of characters, and
 wherein determining the information content of the partial query comprises:
  determining that the quantity of characters does not satisfy a threshold quantity of characters; and
  searching additional data based on determining that the quantity of characters does not satisfy the threshold quantity of characters.

18. The method of claim 15, further comprising:
 obtaining geographic data regarding a plurality of points of interest at a plurality of locations,
  the geographic data including the data and the plurality of points of interest including the set of points of interest;
 classifying the geographic data into a plurality of tiles,
  the plurality of tiles including the set of tiles; and
 storing information associated with the plurality of tiles based on classifying the geographic data into the plurality of tiles and before receiving the partial query.

19. The method of claim 18, wherein determining the set of tiles comprises:
 selecting the set of tiles from the plurality of tiles.

20. The method of claim 18, wherein obtaining the data comprises:
 obtaining the data from the geographic data based on storing the information associated with the plurality of tiles.

* * * * *